United States Patent [19]
Becker et al.

[11] 3,772,944
[45] Nov. 20, 1973

[54] FLANGE FACING MACHINE

[75] Inventors: Anthony F. Becker; W. Mack Crook; Charles R. Sherer; Mason M. Lilly; Robert B. Kinzbach, all of Houston, Tex.

[73] Assignee: DND Corporation, Houston, Tex.

[22] Filed: Jan. 3, 1972

[21] Appl. No.: 215,007

[52] U.S. Cl. ............................................. 82/4 C
[51] Int. Cl. ............................................. B23b 3/26
[58] Field of Search ............................. 82/4 C, 4 R

[56] References Cited
UNITED STATES PATENTS

| 145,103 | 12/1873 | Henderson et al. | 82/4 C |
|---|---|---|---|
| 2,451,729 | 10/1948 | Gardner | 82/4 C |
| 3,181,398 | 5/1965 | Rogers | 82/4 C |
| 2,478,310 | 8/1949 | Payne | 82/4 C |

FOREIGN PATENTS OR APPLICATIONS

| 832,988 | 3/1952 | Germany | 82/4 |
|---|---|---|---|
| 819,483 | 10/1951 | Germany | 82/4 |

*Primary Examiner*—Leonidas Vlachos
*Attorney*—Pravel, Wilson & Matthews

[57] ABSTRACT

A portable compact machine for resurfacing the faces of flanges on pipes and/or valves, wherein a base is releasably mounted in the bore of the pipe or valve in alignment therewith for accurate cutting of the flange face with a lathe tool, and wherein the tool is automatically fed radially as it is rotated by a power means mounted on a support column removably positioned on the base.

1 Claim, 19 Drawing Figures

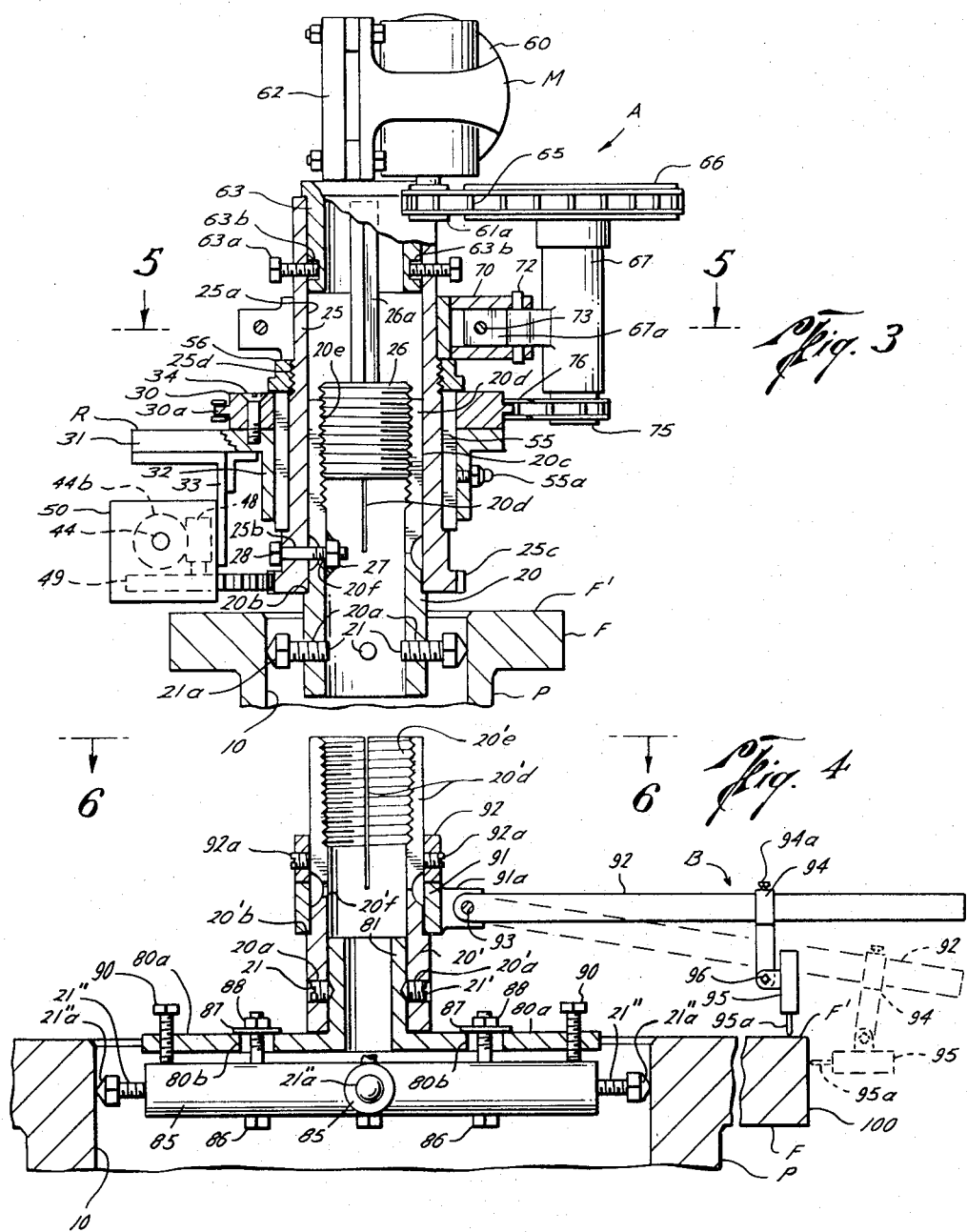

NEUTRAL POSITION

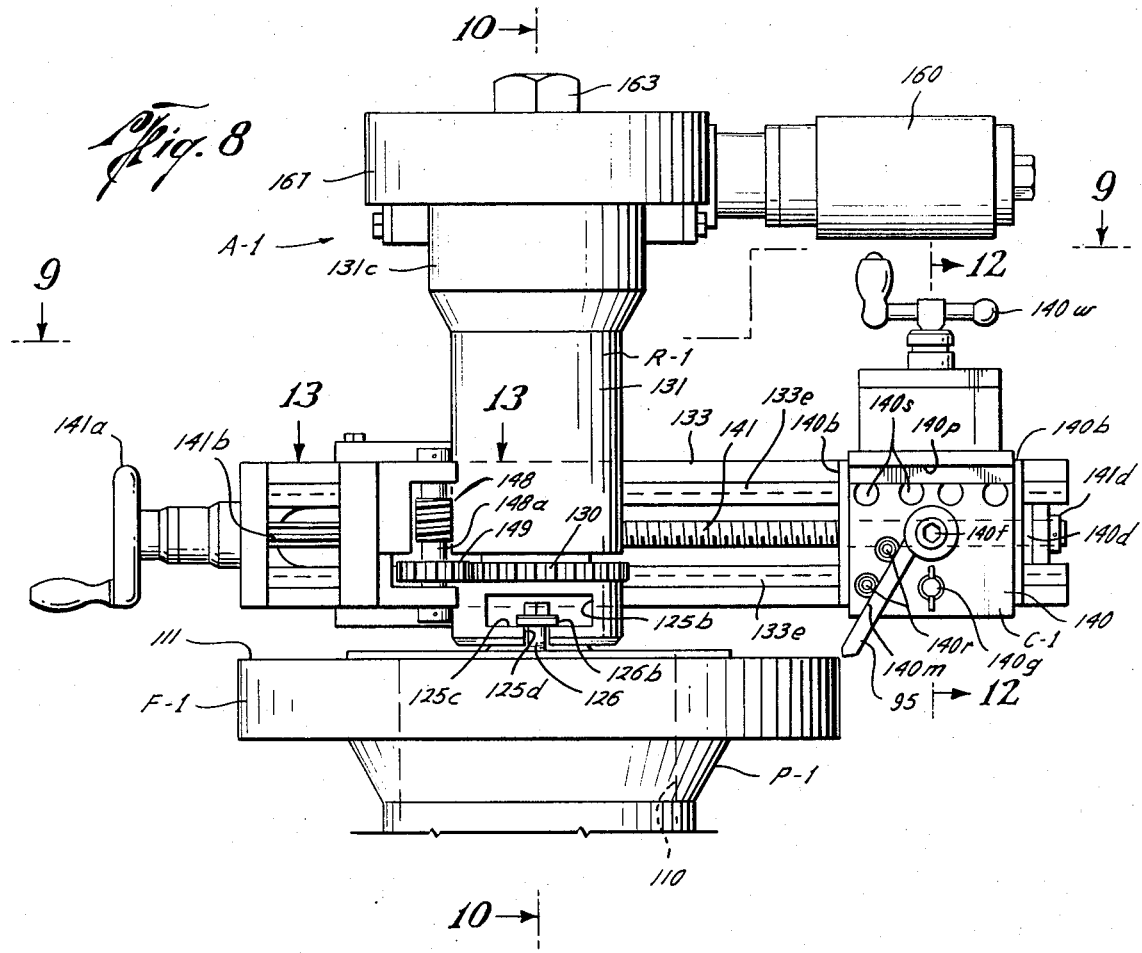
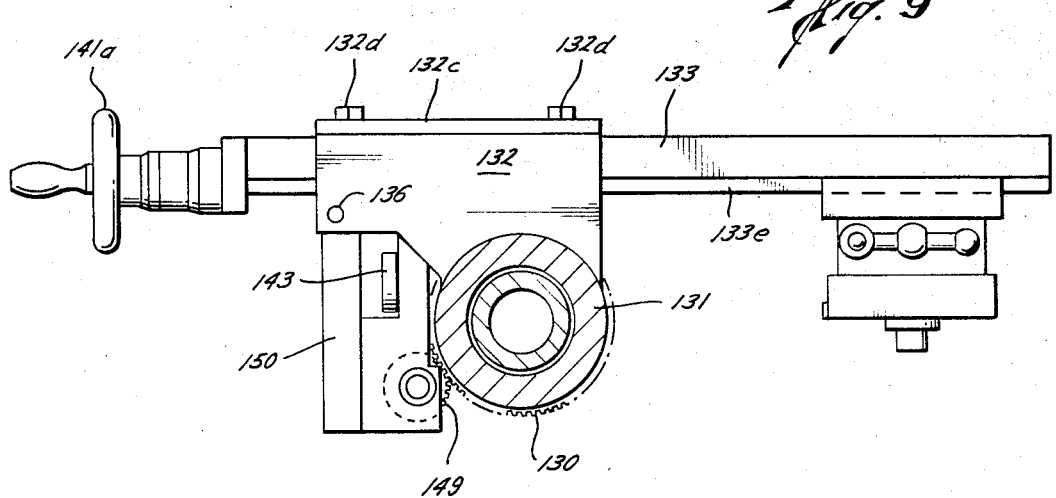

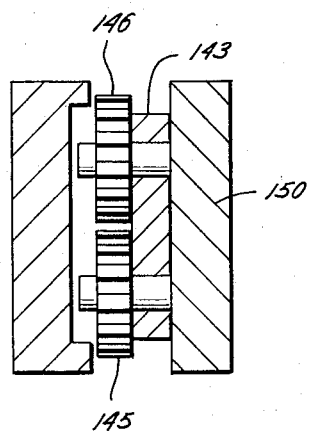
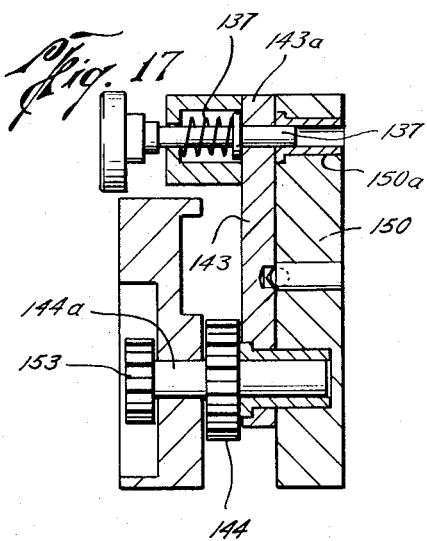
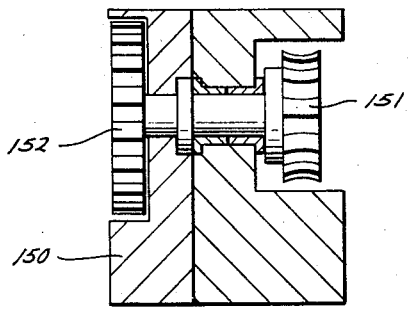
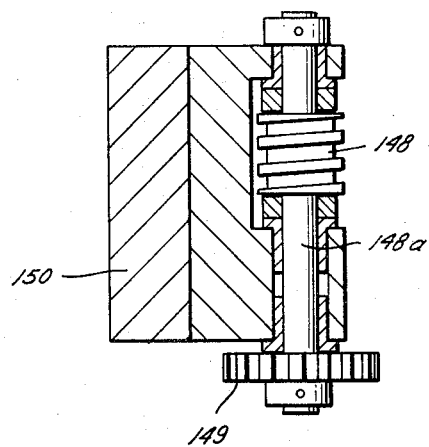

3,772,944

FLANGE FACING MACHINE

BACKGROUND OF THE INVENTION

The field of this invention relates to machines for resurfacing the face of a flange on a pipe or valve.

Although efforts have been made in the past to provide refacing machines and related apparatus, such as illustrated in U. S. Pat. Nos. 2,436,152; 2,478,310; 2,518,929; 3,141,365; 3,181,398; 3,202,190; 3,273,432; 3,324,749; 3,540,329, so far as is known, none of the prior workers have provided a relatively simple compact flange facing machine adapted to be positioned and aligned in the smooth bore of a pipe or valve, wherein a cutting or facing tool is operated for automatic radial feeding in response to the rotation of the tool.

SUMMARY OF THE INVENTION

The present invention relates to a flange facing machine for cutting or resurfacing the face of a flange on a tubular member such as a pipe or valve having a smooth bore, wherein the machine has means for accurately aligning a base in such bore so that precise machining of the flange face can be accomplished. The flange facing machine has a support column which is releasably mounted on the base and upon which a rotatable frame is mounted with a cutting tool for the resurfacing of the flange face. The rotatable frame is driven by a power means such as an electric or hydraulic motor mounted on the support column, and the tool is automatically fed radially as it is rotated.

BRIEF DESCRIPTION OF THE DRAWINGS

FIG. 3 is a side view of the apparatus of FIGS. 1 and 2, partly in section and partly in elevation, showing further details of the flange facing machine of this invention;

FIG. 4 is a sectional view, partly in elevation, of a modified base which may be used with the apparatus of FIGS. 1-3, together with an alignment means for aligning such base with respect to the bore of the pipe or valve upon which it is mounted;

FIG. 8 is an elevation of a modified form of the apparatus of this invention;

FIG. 9 is a view taken on line 9—9 of FIG. 8;

FIG. 16 is a view taken on line 16—16 of FIG. 13 and illustrating details of the gear box portion of the apparatus;

FIG. 17 is a view taken on line 17—17 of FIG. 13 and illustrating further details of the gear box portion of the apparatus;

FIG. 18 is a view taken on line 18—18 of FIG. 13; and

FIG. 19 is a view taken on line 19—19 of FIG. 13.

DESCRIPTION OF THE PREFERRED EMBODIMENTS

Figure 1:
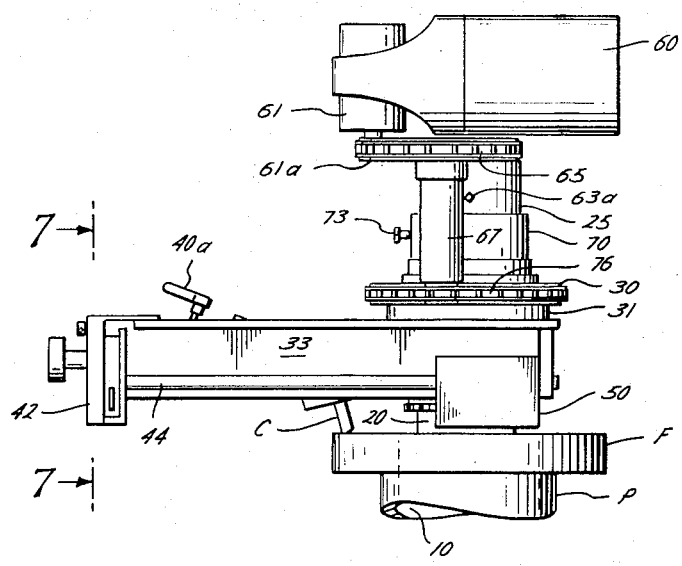
FIG. 1 is an elevation of one form of the apparatus of this invention shown in position for the resurfacing or cutting of a flange on a pipe or valve.
Figure 2:
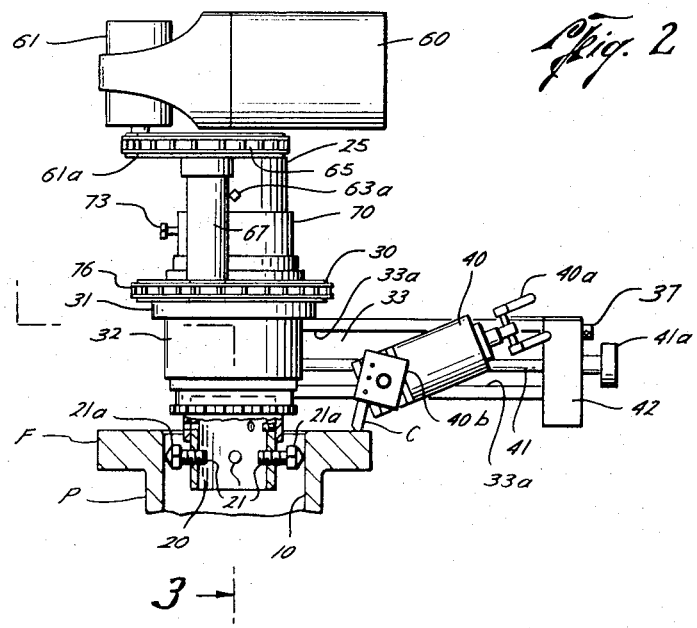
FIG. 2 is a view similar to FIG. 1, but showing the cutting tool in a position substantially 180° from that shown in FIG. 1, and also showing the base and releasable connecting means of the machine of this invention in section.

In the drawings, the letter A designates generally the apparatus of this invention as shown in FIGS. 1-3 which is adapted to be used for the cutting or resurfacing of the face F' of a flange F which is with a pipe, valve or other tubular member P having a smooth inner bore 10. The apparatus A includes a conventional cutting tool C (FIGS. 1 and 2) which may be a conventional lathe cutting tool for cutting steel and other similar materials. As will be expalined in detail, the apparatus A is initially positioned with a portion of it in the bore 10 of the pipe or other tubular member P so as to be accurately aligned for precise machining of the face F' of the flange F by a rotation of the cutting tool as well as an automatic radial movement of such cutting tool C during the rotation thereof.

The apparatus A includes a base 20 (FIGS. 2 and 3) which preferably is a cylinder having a plurality of releasable connecting members 21 therewith. Preferably there are four of the releasable connecting members 21 each of which has a head 21a which is usually in a conical pointed shape for engaging the inside surface of the bore 10 of the pipe P. Each member 21 has threads thereon which are in threaded engagement with threaded openings 20a in the base 20 so that such members 21 may be threaded inwardly and outwardly for releasably engaging the inside surface of the bore 10 as will be more fully explained. Preferably there are four of such threaded connecting members 21 which are disposed diametrically opposite to each other to facilitate the shifting of the base 20 to vertically align the central axis of the base 20 with respect to the central axis of the pipe P. As will be explained in detail hereinafter in connection with the modification of FIG. 4, an alignment means B (FIG. 4) may be employed with the base 20 prior to the assembly of any of the other apparatus A therewith so as to initially align the base 20 with the pipe P.

The base 20 is adapted to releasably receive thereon a tubular column support 25 which preferably seats upon a shoulder 20b on the base 20. The external surface 20c is of a smaller diameter than the inner diameter 25a of the column support 25 so that initially, the column support 25 may be readily lowered into position over and onto the base 20 until it reaches the shoulder 20b. For securely clamping and locking the support column 25 to the base 20, the base 20 is provided with a plurality of longitudinal slots 20d at its upper end so as to render the upper end of the base 20 radially expansible outwardly The inner surface 20e of the base 20 is threaded and is of substantially uniform diameter throughout its threaded portion. An expander plug or member 26 having threads thereon which are tapered downwardly and inwardly is adapted to be inserted into the threads 20e so that the lower portion of the threads on the expander 26 can initially enter the threads 20e without any appreciable expansion of the resilient upper portion of the base 20, but as the plug 26 is threaded downwardly relative to the base 20, the wedging action of the tapered threaded member 26 causes the resilient upper portion of the base 20 to expand outwardly. Such outward radial expansion of the upper portion of the base 20 causes a frictional engagement between the external surface 20c and the internal surface 25a to frictionally hold the base 20 and the tubular column support 25 together. Thus, the tubular column support 25 is effectively aligned in the same alignment as the base 20.

For safety purposes, the base 20 has a nut 27 welded internally thereof in alignment with an opening 20f in the wall of the base 20 for receiving a bolt 28 which extends through a suitable opening 25b in the wall of the support column 25. The openings 25b and 20f are aligned, and normally, the bolt 28 is threaded into the nut 27 prior to the expansion of the upper portion of the base 20 by the downward rotation of the expander 26, as previously explained. It is to be noted that the expander 26 has a shaft 26a therewith which has one or more flat sides for engagement by a wrench or similar tool to facilitate rotation of the expander member 26. It will be appreciated that other means for rotating such expander 26 would be suitable and could be provided in lieu of the shaft 26a.

Figure 7:
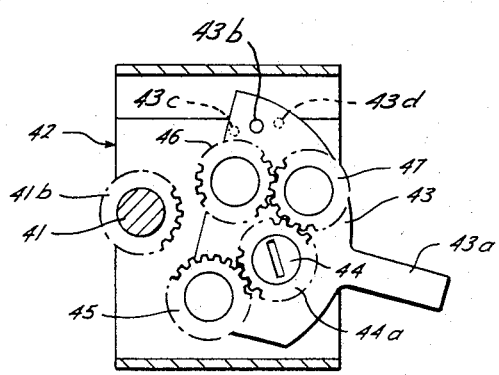
FIG. 7 is an elevation, partly in section, of a gear control for the feeding of the cutting tool used with the machine of this invention.

A rotatable frame R is mounted on the support column 25 for rotation relative thereto. As illustrated in the drawings, the rotatable frame includes a ring gear 30 having gear teeth 30a externally thereof. The ring gear 30a is connected to a bracket 31 which has a ring portion 32 and a longitudinally extending arm 33. Such connection is preferably provided by one or more screws 34 (FIG. 3). The bar 33 is in effect a conventional carriage for a lathe cutting tool mechanism 40 which adjustably supports the cutting tool C in a known manner. The lathe supporting mechanism 40 is adapted to move substantially horizontally as viewed in FIGS. 1 and 2 relative to the carriage 33 in ways or other conventional beveled guides 33a on the carriage 33 which are engaged by corresponding inter engaging guides on the mechanism 40 in the known manner. The mechanism 40 is moved radially along such carriage 30 by the rotation of a threaded shaft 41 which is connected into the gear box 42, the details of which will be hereinafter described (FIG. 7). Such shaft 41 may also be rotated manually by a control knob 41a in the conventional manner for moving the lathe support mechanism 40 inwardly and outwardly along the carriage 33. The mechanism 40 has internal gearing of conventional construction which is controlled by a handle 40a in the known manner to adjust the angle of the cutting tool C with respect to the work which is to be cut by the cutting tool C, in the known manner. Also, a movable plate 40b is provided on the mechanism 40 of conventional construction for further providing adjustments to the angle and position of the cutting tool C with respect to the rest of the mechanism 40 as will be well understood by those skilled in the art. Referring now to the gear box 42, the shaft 41 has a gear 41b thereon which is rotatable therewith. An assembly of gears are mounted on a pivoted plate 43 having a control lever 43a therewith. The plate 43 is pivotally mounted on and is connected to a drive shaft 44 (FIGS. 1, 3 and 7), and such shaft has a gear 44a which is rotatable therewith. A first gear 45 is rotatably mounted on the plate 43 in engagement with the gear 44a so that when the gear 45 is in engagement with the gear 41b, rotation of the shaft 44 is imparted to the shaft 41 in a direction to move the cutting tool C radially inwardly towards the bore 10 of the pipe or other tubular member. A second gear 46 is rotatably mounted on the plate 43 and it is connected through an idler gear 47 which is also rotatably mounted on the plate 43 and which engages the gear 44a so that when the gear 46 is engaged with the gear 41b, the rotation of the shaft 44 is transmitted to the shaft 41, but in an opposite direction to the rotation which is transmitted through the shaft 45 to thereby cause the cutting tool C to reverse its travel and move radially outwardly with respect to the bore 10 of the pipe P or other tubular member. As illustrated in FIG. 7, both of the gears 45 and 46 may be disconnected from the gear 41b, which is the neutral position, so that a manual movement radially of the lathe mechanism 40 may be accomplished by the rotation of the handle 41a independently of the movement of the shaft 44. Any suitable means may be used to hold the plate 43 in the desired position. For example a spring loaded holding pin 37 (FIG. 2) may be released and positioned in hole 43b for the neutral position (FIG. 7) or in the holes 43c or 43d for the forward and reverse positions. When the lever 43a is moved downwardly from the position shown in FIG. 7, the plate 43 is rotated to move the gear 45 into engagement with the gear 41b. An upward movement of the lever 43a from the neutral position shown in FIG. 7 results in an engagement of the gear 46 with the gear 41b.

The shaft 44 extends into a gear housing 50 (FIG. 1) and it has therein a wormgear 44b mounted thereon for engagement with a worm 48 which is connected to and which is driven by a gear 49 which in turn is in operable engagement with an external ring gear 25c on the support column 25, as will be more evident hereinafter. As will be explained hereinafter, upon a rotation of the rotatable frame R, the ring gear 49 is rotated by reason of its engagement with the ring gear 25c so as to cause a rotation of the shaft 44 which is transmitted to the shaft 41, depending upon the position of the gears in the gear box 42, as previously explained.

Preferably, a sleeve bearing 55 or other suitable type of bearing means is provided between the rotatable frame R and the external surface of the support column 25 so as to have a relatively anti-friction mounting therebetween. The sleeve 55 may be a bronze lubricated sleeve and preferably a lubrication fitting 55a is provided for introducing lubricant to the bearing sleeve 55. The bearing sleeve 55 is retained in positiion as illustrated in FIG. 3 and the ring gear 30 is likewise retained in position by means of a nut 56 which is threaded onto the external surface of the tubular column support 25 at threads 25d.

Figure 5:
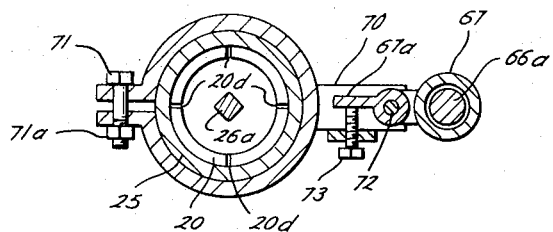
FIG. 5 is a cross-sectional view taken on line 505 of FIG. 3.

For rotating the rotatable frame R, power means M is provided which in the form of the invention illustrated includes either an electric or hydrualic motor 60 which is connected through suitable gearing in a gear housing 61 to a drive sprocket 61a. The motor 60 is supported on a mounting bracket generally designated at 62 which is suitably connected to a support sleeve 63 which fits within the bore of the support column 25 and which is preferably anchored thereto by one or more bolts 63a as shown in FIG. 3. The sprocket 61a has a chain 65 engaged therewith and which extends to a larger sprocket 66 mounted on a rotatable shaft in a sleeve 67 (FIGS. 3 and 5). The sleeve 67 is pivotally mounted on a ring bracket 70 which is releasably clamped to the external surface of the support column 25 by a clamping bolt 71 having a nut 71a therewith (FIG. 5). The sleeve 70 is pivotally connected through a pivot pin 72 to such bracket 70, and the position of such sleeve 67 is set by adjustable screw or bolt 73 which fits in the bracket 70 and engages a lever 67a which is integral with the sleeve 67.

The shaft 66a which is shown in FIG. 5 extends downwardly through the sleeve 67 and it has a sprocket 75 thereon below the sleeve 67 which receives another chain 76 that is disposed in engagement with the teeth 30a of the ring gear 30. By the adjustment of the screw 73, it can be seen that the sleeve 67 may be pivoted outwardly about the pivot pin 72 to control the tightness of the chains 65 and 76 on their respective sprockets so as to assure a positive drive from the motor 60 to the ring gear 30 at all times. Also, by a release of the bolt or screws 73 so as to permit a pivoting of the sleeve 67 inwardly towards the support column 25, the chains 65 and 76 may be placed in a slack condition so that they can be readily removed without taking the chains apart, when it is desired to disassemble the apparatus for replacement or repair. It should be noted that although the chain drive which includes the two chains 65 and 76 is preferable in view of the positive drive action which is obtained, it will be appreciated by those skilled in the art that an equivalent drive means may be provided directly from the motor 60 to the ring gear 30.

In the operation or use of the apparatus A as illustrated in FIGS. 1–3, 5 and 7 in particular, the base 20 is initially positioned in the bore 10 prior to mounting any of the other apparatus A thereon. The base 20 is releasably secured to the bore 10 of the pipe P or other tubular member by means of the threaded connecting members 21, as previously explained, and preferably, the base 20 is aligned at that point with the bore of such tubular member P. Such alignment may be accomplished with the alignment mechanism B illustrated in FIG. 4 as will be more fully described hereinafter.

After the base 20 has been secured within the bore 10, the support column 25 is next positioned on the base 20. The support column 25 may already have assembled therewith the rotatable frame R, the nut 56, the bearing 55, the bracket 70 and the sleeve 67 with the sprockets 66 and 75. The bolt 28 is then threaded into the nut 27. The plug or expander 26 is introduced through the open upper end of the support column 25 since the power means M is not normally in position on the apparatus A at that time. The shaft 26a is rotated using a wrench or other similar tool to rotate and thread the expander 26 downwardly into the threads 20e to thereby outwardly expand the upper portion of the base 20 for frictionally engaging the inside surface of the support column 25 to lock the column 25 to the base 20.

Thereafter, the power means M is positioned as shown in FIG. 3, with the cylindrical sleeve 63 disposed in the bore of the support column 25. The connecting bolts 63a are then threaded inwardly so as to engage a recess 63b of the sleeve 63. The chains 65 and 76 are disposed on the sprockets 61a, 66 and 75, 30a, with the screw 73 threaded outwardly from its position shown in FIG. 5 so that such chains 65 and 76 may be connected to their respective sprockets while they are in a slack condition. Thereafter, the screw 73 is threaded inwardly to force the sleeve 67 to pivot about the pivot pin 72 to tighten the chains 65 and 76 on their respective sprockets.

Power is then supplied to the motor 60 to drive the chains 65 and 76 and thus to drive the ring gear 30 and rotate the rotatable frame R relative to the support column 25. The rotation of the frame R rotates the cutting tool C relative to the face F' of the flange F and by reason of the coaction between the ring gear 25c and the gears connected therewith, as previously explained, the cutting tool C is moved radially either inwardly or outwardly depending upon the position of the gears in the gear box 42. Thus, with the gear 45 engaged with the gear 41d, the shaft 41 is rotated so as to move the cutting tool mechanism 40 and the cutting tool C therewith radially inwardly. On the other hand, when the gear 46 is engaged with the gear 41b, the cutting tool C and the mechanism 40 are moved radially outwardly. Such radial movement of the cutting tool C in either direction is automatic and is in response to the rotation of the rotatable frame R so that there is in effect an automatic spiral feeding of the cutting tool C either inwardly or outwardly, depending upon the starting point for the cutting tool C. The cutting tool C may be initially positioned for starting the cutting action at the outermost point on the face F' of the flange F and it may be operated so as to move radially inwardly for the full surface of the face F'. Then, the gears in the gear box 42 may be shifted by shifting the lever 43a to reverse the radial direction of movement of the cutting tool C so that it moves radially outwardly. The depth of the cut of the cutting tool C as it moves radially is determined by the initial setting for each pass thereof, which is accomplished in the conventional manner by the manipulation of the handle 40a and/or the setting of the plate 40b.

Figure 6:
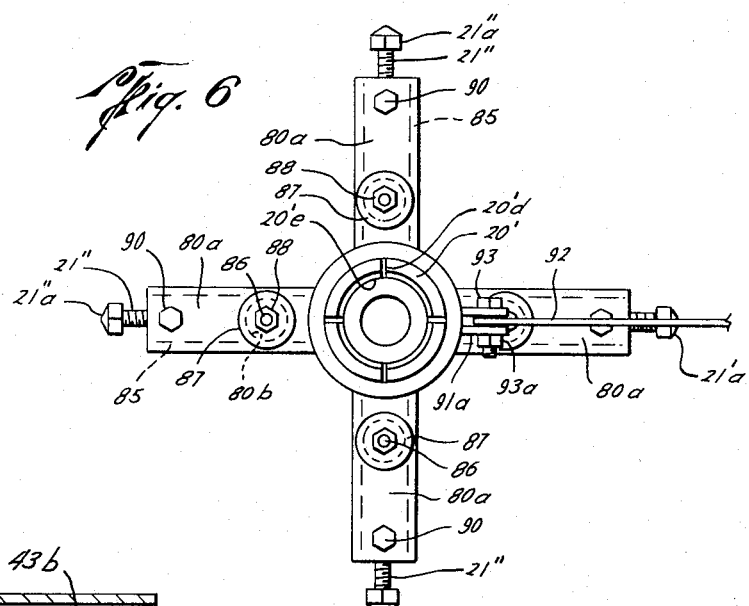
FIG. 6 is a view taken on line 6—6 of FIG. 4, omitting the pipe of FIG. 4 for purposes of illustration.

In FIGS. 4 and 6, a modified base 20' is illustrated together with the alignment means B. The base 20' may actually be the same as the base 20 of FIG. 3, and is so illustrated, with most like parts having the same numbers, except for prime marks. The openings 20'a are threaded like the openings 20a for receiving a plurality of set screws 21' for releasably locking the base 20' to an adjustment platform 80 which has a tubular portion 81 therewith, extending upwardly into the bottom of the bore of the base 20' as shown in FIG. 4. The shoulder 20'b corresponds with the shoulder 20b, and the upper portion of the base 20' is slotted at 20'd and it is internally threaded at 20'e in the same manner as the base 20.

The adjustment platform is mounted upon a spider which is illustrated as having four spider arms 85 (FIG. 6), at the end of which is a threaded connecting member 21''. Such connecting members 21'' have threads and are threaded into corresponding thread openings in the spiders 85 therewith so that they may be threaded inwardly and outwardly so that each head 21''a may engage the bore 10 of the pipe P or other tubular member. Such connection to the bore 10 is thus substantially the same as that provided by the connecting members 21 in FIGS. 2 and 3.

The platform 80 is adjustable with respect to the spider arms 85 after the spider arms 85 have been secured in the bore 10 by the engagement of the connecting members 21'' with the bore 10. Thus, with the form of the invention illustrated in FIG. 4, the spider arms 85 may be initially positioned in approximately the desired position so as to approximately locate the central axis of the base 20' substantially in alignment with the central axis of the bore 10 of the pipe P. Because of the adjustable connection between the spider formed by the spider arms 85 and the platform 80, as will be explained, the exact alignment of the base 20' may thereafter be accomplished.

Thus the platform 80 includes a leg 80a disposed over each of the arms 85 and which are connected thereto by bolts 86 which extend through openings 80b, with a washer 87 and a nut 88 disposed above each leg 80a. The hole 80b for each of the bolts 86 is larger than the diameter of the bolt 86 so that the entire platform 80 may be shifted laterally relative to the spider formed by the arms 85. Adjustment screws 90 are threaded through suitable openings in each of the legs 80a for maintaining the platform 80 at the desired elevation with respect to the spider arms 85. Thus, if it is desired to shift the base 20' laterally with respect to the spider arms 85, it is simply necessary to loosen the nuts 88 and then to retighten them when they have been moved to the new position. Should it be desired to tilt the base 20' for aligning the central axis thereof with the central axis of the bore of the pipe P, this may be readily accomplished by loosening the nut 88 on the side which is to be raised and then by unthreading or backing out the screw 90 on the opposite leg 80a therefrom. The screw 90 on the leg 80 with the nut 88 which has been loosened is then tightened or threaded inwardly until the leg 80a with the loosened nut 88 again reaches a stop point in engagement with the washer 87 therewith. At that point, the nut 88 on the opposite leg 80a is tightened down to the new position and the screw 90 on such opposite leg 80a is also screwed downwardly or is returned to contact with the spider arm 85 therebelow. Thus, the platform 80 is then locked again in the new position. It will be appreciated that this may be accomplished for any direction of tilt which is desired, using the opposite legs 80a for any combination of tilting movements.

The alignment means B which is preferably used for the alignment of the base 20' includes a rotatable collar 91 which is disposed on the external surface of the base 20' and which rests upon the shoulder 20b' so that the collar 91 may rotate relative to the base 20'. Preferably, a retaining ring 92 having locking screws 92a therewith is disposed above the collar 91 for holding the collar 91 in a fixed vertical position as it is rotated relative to the base 20'. The set screws 92a are of course threaded inwardly into frictional engagement with the base 20' to thereby releasably lock the ring 92 in the position above the collar 91. The collar 91 has a clevis 91a therewith (FIGS. 4 and 6), to which is pivotally connected an alignment arm 92 by means of a bolt 93 and a nut 93a therewith. The nut 93a is preferably tightened so that the alignment arm 92 is frictionally held between the two arms of the clevis 91a so that the arm 92 may be pivoted about the bolt 93 with sufficient restraint so that the arm 92 will not thereafter pivot by itself once it has been moved to a selected position.

A sliding holder 94 is releasably secured to the arm 92 by a set screw 94a for holding a dial indicator or mechanical pressure gage 95 and a contact member 95a therewith in a position for normally contacting the face F' of the flange F. The dial indicator gage 95 may be mounted on the alignment arm 92 in any suitable manner, but as illustrated it is attached by a releasable bolt or screw 96 so that it may be moved from the solid line position of FIG. 4 to the dotted line position when it is desired to have the contact member 95a engage the outer annular surface or edge 100 of the flange F (FIG. 4).

The gage 95 may be a conventional dial indicator or mechanical pressure gage which has a pointer and a dial (not shown) so that an operator may read the amount of the mechanical force or pressure exerted by the contact member 95a at various points throughout the rotation of the contact member 95a with respect to the flange face F' or the annular edge 100. Thus, if the gage 95 reads the same throughout a full rotation thereof with the contact member 95a in contact with the face F', this is an indication that the face F' is perpendicular to the central axis of the bore 10 and therefore, the central axis of the bore 10 is parallel to the central axis of the base 20'. Then, when the gage 95 reads substantially the same throughout a full revolution thereof with the contact member 95a in contact with the surface 100 or a similar surface, this would indicate that the central axis of the base 20' is laterally aligned with the central axis of the bore 10. By comparing such readings and making suitable adjustments in the location of the platform relative to the spider arms 85, as previously explained, the central axis of the base 20' can be essentially aligned precisely with the central axis of the bore 10 of the pipe P.

It will be appreciated that the alignment means B may be used with the base 20 in the same manner as described heretofore for the base 20'. Thus, the collar 91 would be disposed on the external surface of the base 20 at the shoulder 20b. It should also be understood that the contact member 95a does not have to be connected to a gage but may simply be a contact point or stylus which may be rotated so that when it contacts the flange face F' at some points and misses at others, the operator will know that the base 20' or the base 20 is not properly aligned and the alignment can be adjusted until contact member 95a contacts substantially uniformly througout each revolution, whether in contact with the face F' or the annular outer edge 100.

After the base 20' or the base 20 is aligned, the locking ring 92 is removed by releasing the set screws 92a and then the collar 91 is also lifted off of the base 20' or 20 so that the alignment means B is completely removed therefrom. Thereafter, the assembly of the rest of the apparatus A is carried out as heretofore described, using either the base 20' or the base 20.

In FIGS. 8-19, a modified form of the apparatus of this invention is illustrated which is generally designated A-1. As will be more fully explained, the apparatus A-1 is constructed in essentially the same manner as the apparatus A with certain changes as will be described in detail hereinafter. The apparatus A-1 is likewise adapted to be positioned with a portion thereof in a bore 110 of a pipe P-1 having a flange F-1 thereon so that a cutting tool C-1 may be utilized for cutting or resurfacing the face 111 of the flange S-1. The apparatus A-1 may also be mounted in any other kind of a pipe such as the pipe P illustrated in FIGS. 1-3. The parts of the apparatus A-1 which are similar to or correspond to like parts in the apparatus A bear the same letters and/or numerals with the prefix "1" for the apparatus A-1 in most instances.

Thus, the apparatus A-1 includes a base 120 (FIG. 10) which is preferably cylindrical and has a plurality of releasable connecting members 121 therewith. Preferably there are three of the releasable connecting members 121, each of which has teeth 121a for engaging the inside surface of the bore 110 of the pipe P-1. The base 21 has an opening 120a in which each of the connecting members 120 is disposed for substantially radial movement relative to the base 120. To effect the radial movement of each of the connecting members 121, each member 121 is releasably engaged with a cone shaped expander 122 having a threaded hole 122a therein, into which is threaded an actuating bolt 123. Each expander 122 as an inclined surface 122b which is adapted to engage a corresponding inclined surface 121b on the inside of its connecting member 121. To provide for a retraction or inward radial movement of the gripping or connecting members 121, a dovetail slot 122c is provided on the inclined surface 122b of each expander 122 for receiving oppositely tapered heads 121c on one or more bolts secured to the tapered inner surface 121b. Thus, each of the gripping or connecting members 121 has an expander 122 therewith which is adapted to be moved vertically or longitudinally with respect to the member 121 for urging same radially inwardly or outwardly, depending upon the direction of movement of the expander 122, which is controlled by the threading movement of the actuator bolt 123. It will be understood that there is therefore an expander bolt 123 and an expander 122 for each of the plurality of connecting members 121. Each bolt 123 has its head 123a positioned so that it can be reached by a screwdriver or other similar tool, as will be more fully explained.

The base 120 is adapted to releasably receive thereon a tubular column support or mast 125 which has a concave annular shoulder 125a which preferably seats upon a correspondingly curved convex annular shoulder 120b on the base 120. The curvature of such surfaces 125a and 120b facilitates a vertical alignment of the support column or mast 125 relative to the base 120, as will be more evident hereinafter.

Figure 10:
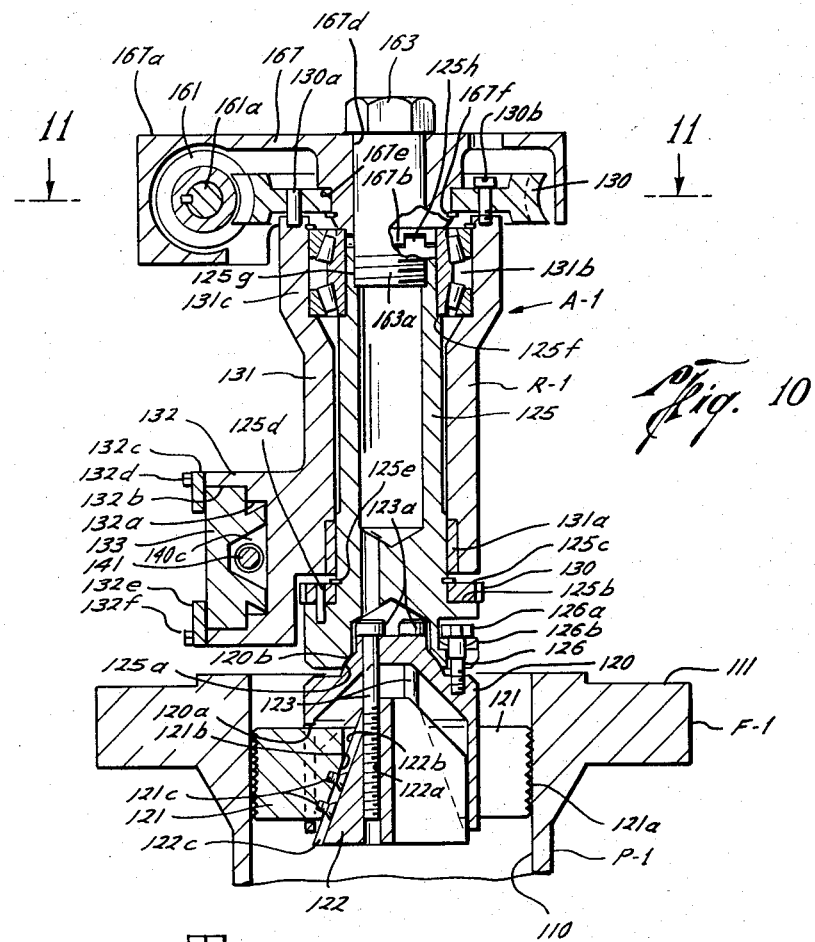
FIG. 10 is a vertical sectional view taken on line 10—10 of FIG. 8.
Figure 11:
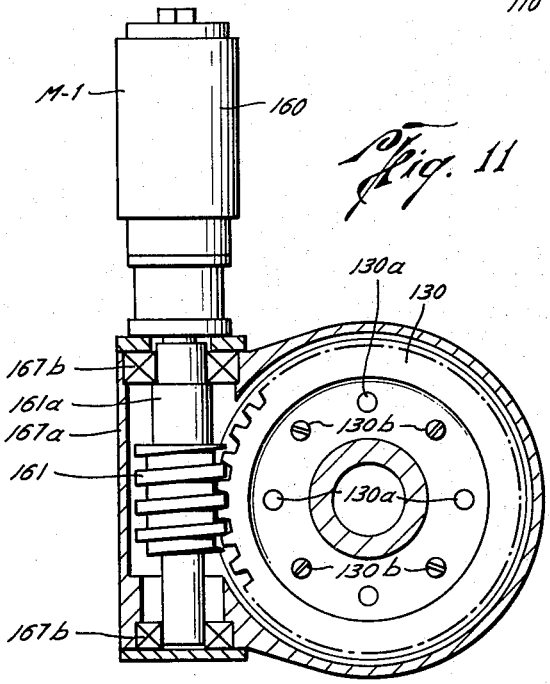
FIG. 11 is a horizontal sectional view taken on line 11—11 of FIG. 10.

For securely clamping and locking the support column 125 to the base 120, a plurality of clamping bolts 126, preferably three in number, are positioned with each bolt head 126a and preferably a washer 126b in a recess 125d and in engagement with a shoulder 125c, with the bolt 126 threaded to the base 120 (FIG. 10). Each bolt 126 extends through a slot 125d in the lower portion of the column 125. The base 120 is not normally completely disconnected from the column 125, although this may be done if desired by completely unthreading the bolts 126 from the base 120. During the vertical alignment of the column 125, after the base 120 has been secured in the bore 110, the bolts 126 are loosened and then tightened as required when the vertical position of the column 125 is obtained, preferably using the apparatus for leveling heretofore described in connection with FIG. 4 of the drawings and as will be more evident hereinafter. The mast or column 125 has a ring gear 125c mounted on an annular shoulder 125b and with one or more dowel pins 125d extending from the ring gear 125c into the column 125 (FIG. 10). Also, a snap ring or other releasable attachment means 125e is provided for holding the ring gear on the shoulder 125b.

A rotatable frame R-1 is mounted on the column or mast 125 for rotation relative thereto. The rotatable frame R-1 preferably includes a cylindrical frame member or housing 131 having a laterally extending side portion 132 formed integrally therewith (FIG. 10). A sleeve bearing 131 is disposed between the lower inner surface of the housing 131 and the external surface of the column or mast 125. An upper bearing 131b, which is preferably a tapered roller bearing is disposed between the upper enlarged portion 131c of the housing 131 and the upper end of the mast 125. The lower part of the bearing 131b rests upon an annular shoulder 125f to provide support for the rotatable frame R-1 on the mast 125, as will be more evident hereinafter. A ring gear 130 is secured to the upper enlarged end 131c of the housing 131 by a plurality of dowel pins 130a and a plurality of holding bolts 130b. The dowel pins 130a are adapted to take the load in transmitting rotation from the gear 130 to the cylinder 131, and the bolts 130b are provided for maintaining the gear 130 in the relative position shown with respect to the housing 131. It will be appreciated that a ring gear 130 may be secured to the rotatable housing 131 by any other suitable means, but the use of the pins 130a and the bolts 130b facilitate assembly and disassembly of the apparatus A-1, as will be well understood.

For rotating the ring gear 130 and the rotatable frame R-1, as will be more fully described hereinafter, a power means M-1 is provided which includes an electrical, hydraulic or pneumatic motor 160 which drives a worm 161 in driving engagement with the ring gear 130. The worm 161 and the motor 160 are preferably supported by a support cap 167 which is secured to the mast 125 by a large connecting bolt 163 having threads 163a thereon adapted to threadedly engage internal threads 125g in the upper bore of the mast or column 125. The support cap 167 has a central bore 167d for receiving the bolt 163 and it also has a plurality of splines or lugs 167b which interfit with alternating splines or lugs 125h on the upper end of the support column 125 so that when the support cap 167 is resting upon the upper end of the column 125, it is prevented from rotating relative thereto after the bolt 163 has been tightened down to the position shown in FIG. 10. The support cap 167 has an extension or side portion 167a which carries spaced bearings 167b for the shaft 161a upon which the worm 161 is mounted. The motor 160 is bolted or is otherwise secured to the support cap 167 at the end of the extension 167a (FIG. 11) so as to be supported thereby. The housing cap 167a has a recess 167e into which the ring gear 130 is disposed. A snap ring 167f serves to position the ring gear 130 relative to the recess 167e, but it is to be noted that the ring gear 130 rotates relative to the support cap 167 when it is driven by the worm 161. Thus, the tapered roller bearing 131b supports the housing 131 and the ring gear 130 as they rotate relative to the mast 125 and the cap 167. An extending arm 133 is slidably disposed in the side portion 132 of the rotatable frame R-1 for supporting the cutting tool assembly C-1, as will be more evident hereinafter. The arm 133 is preferably removably mounted with respect to the frame side portion 132 by providing a recess or way 132a having an enlarged recess portion 132b therewith for receiving a mid-portion of the arm 133. An upper keeper plate 132c having bolts or screws 132d extending therethrough into the portion 132 serves to hold the upper end of the arm 133 in the recesses 132a and 132b. Similarly a lower keeper plate 132e has connection to the frame portion 132 by bolts or screws 132f extending therethrough into the portion 132 to confine the lower part of the arm 133. By loosening the screws 132d and 132f, the position of the arm 133 relative to the support portion 132 may be adjusted and then the screws or bolts 132d and 132f may be tightened to clamp the arm 133 firmly in position relative to the frame portion 132 so that it rotates with the rest of the rotatable frame R-1.

A lead screw 141 having a handle or crank 141a therewith is mounted on the longitudinally extending support arm 133 for rotation, but without any longitudinal travel relative to the arm 133. A splined section 141b is provided at one end of the lead screw 141 so that a gear 141c mounted thereon may be rotated by the lead screw 141 while permitting longitudinal movement of the lead screw 141 relative to the gear 141c when the arm 133 is shifted relative to the support portion 132, as previously explained.

Figure 13:
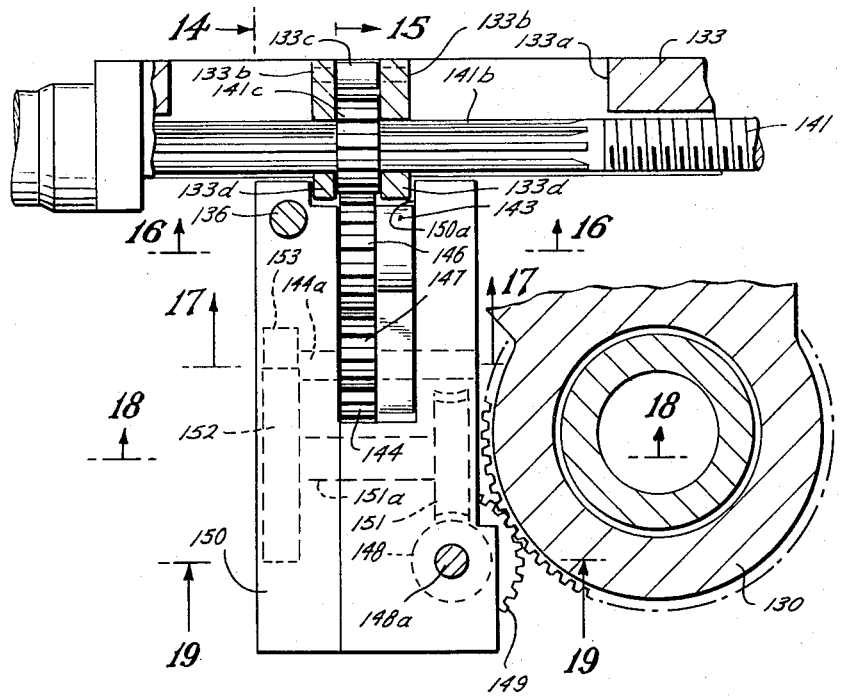
FIG. 13 is a horizontal cross-sectional view taken on line 13—13 of FIG. 8.
Figure 14:
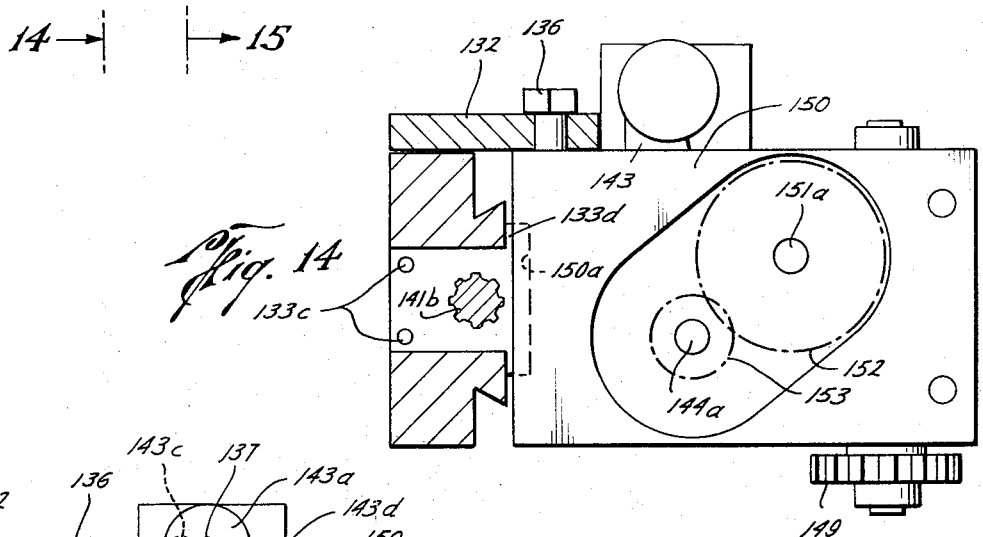
FIG. 14 is a view taken on line 14—14 of FIG. 13 and illustrating specifically the gear box portion of the apparatus.
Figure 15:
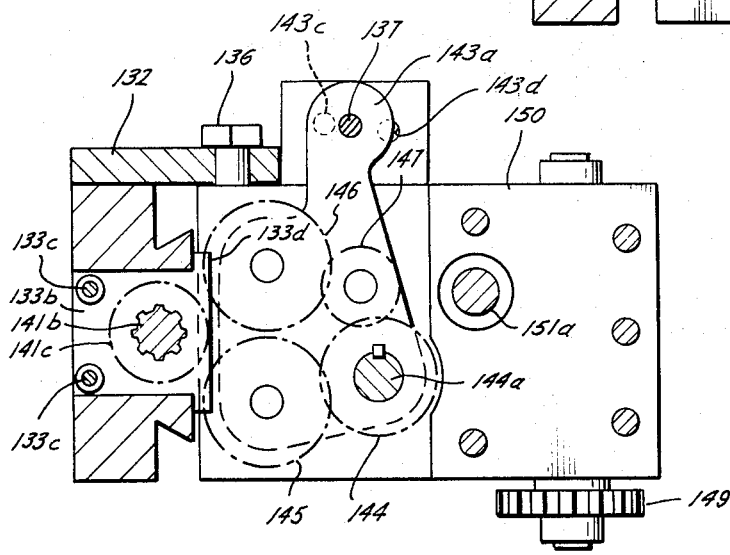
FIG. 15 is a view taken on line 15—15 of FIG. 13, and illustrating further details of the gear box portion of the apparatus.

For transmitting rotation of the rotatable frame R-1 to the lead screw 141 so as to automatically feed the cutter tool assembly C-1 during the rotation thereof relative to the flange F-1, the gear 141c on the splined section 141b of the lead screw 141 is mounted adjacent to a gear housing 150 which is preferably pivotally secured to a portion of the frame side extension 132 by a pivot bolt 136 (FIGS. 13–15).

The gear housing 150 has mounted therein a gear shifting plate 143 having a handle 143a thereon. The plate 143 is pivotally mounted relative to the gear housing 150 on a shaft 144a suitably mounted in bearings (not shown) with respect to the gear housing 150 and which has a gear 144 thereon (FIGS. 13 and 15). The shifting plate 143 also has rotatably mounted thereon a gear 145 which is meshed with the gear 144 but not with any of the other gears on the plate 143. A gear 147 is also mounted on the plate 143 in meshing engagement with the gear 144 and it in turn is in meshing engagement with gear 146 also mounted on the plate 143. It is to be noted that the gears 145 and 146 are not in engagement with each other. The plate 143 may be pivoted to the position shown in FIG. 15 wherein neither of the gears 145 or 146 is in engagement with the gear 141c, which is the neutral position in which there is no driving of the lead screw 141. When the plate 143 is shifted to the right as viewed in FIG. 15, the gear 145 is brought into driving engagement with the gear 141c to thereby rotate the lead screw 141 in one direction, and upon shifting the plate 143 to the left from the position shown in FIG. 15, the gear 146 may be brought into driving engagement with the gear 141c to thereby drive the lead screw 141 in the opposite direction. To hold the plate 143 in the neutral position, a spring pressed ball 138 in the housing 150 engages in a detent 143b in the plate 143 (FIG. 17). To hold the plate 143 in either the forward or reverse positions, any suitable means may be employed such as a spring-pressed holding pin 137 which is releasably urged by a spring 137a into either hole 143c or 143d (FIG. 14) having a busing 150a therein (FIG. 17) in alignment therewith.

Driving power to the gear 144 is supplied by a series of gears starting with a gear 149 which is in driving engagement with the ring gear 130. The gear 149 drives a worm 148 on the shaft 148a, and the worm 148 is in driving engagement with a gear 151 which is mounted on a shaft 151a. The rotation of the shaft 151a is transmitted to a gear 152 which is in driving engagement with a gear 153 on shaft 144a so as to transmit rotation to the gear 144. As previously noted, the shaft 144a extends through the shift plate 143 (FIG. 13) and is mounted with the gear box housing 153 so that the plate 143 can pivot about such shaft 144a, and at the same time, the shaft 144a rotates when the gears 153 and 144 thereon rotate.

A gap 133a is provided in the arm 133 (FIG. 13) which corresponds substantially with the length of the splined portion 141b of the lead screw 141. For confining the gear 141c to prevent its movement when the longitudinally extending arm 133 is shifted longitudinally for relocation, a pair of confining plates 133b are disposed in the gap 133a and are secured together by any suitable means such as a pair of connecting pins 133c (FIGS. 13–15). Each plate preferably has lugs 133d which extend into a suitable slot or opening 150a in the housing 150 (FIG. 13) to prevent lateral shifting of such plates 133b relative to the housing 150.

The longitudinally extending arm 133 has upper and lower dovetail slides 133e (FIGS. 8, 9 and 12) which are adapted to interfit with corresponding dovetail surfaces 140a on a tool holder 140 forming part of the cutting tool assembly C-1. The threaded lead screw 141 is threadedly connected to the tool holder 140 in any conventional manner for the feeding or movement of the tool holder 140 on the arm 133 along the dovetail guides 133e. The mounting of such tool holder 140 may correspond with any conventional mounting for a tool holder on a lathe, and as illustrated the lead screw 141 passes through guide plates 140b on each side of the holder 140 (FIG. 8) and is threaded into a threaded nut 140c (FIG. 10) which is welded or is otherwise secured to the work holder 140 so as to move therewith. A bearing 140d is preferably provided for supporting the lead screw 141 and it does not move with the work holder 140, but instead is secured to the arm 133 in the position shown in FIG. 8 by any suitable means, including a retaining collar ring 141d.

Figure 12:
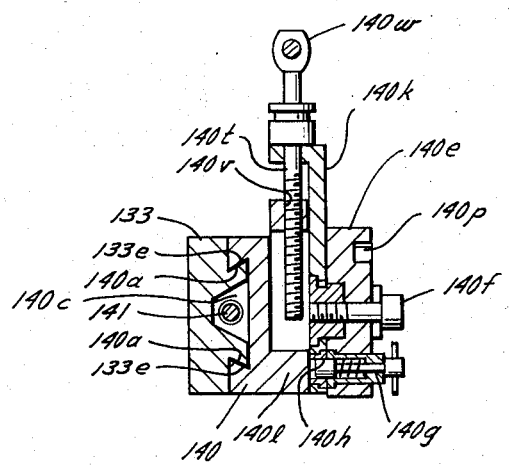
FIG. 12 is a sectional view taken on line 12—12 of FIG. 8.

The work holder 140 has a rotatable work holder member 140e which is rotatably mounted on a pivot bolt or pin 140f (FIG. 12). A spring loaded locking pin 140g is mounted so that its inner end is adapted to extend into a positioning hole 140h in the non-rotatable portion 140k of the work holder 140 so as to locate the tool at different positions relative to the face 111 of the flange F-1, as will be more evident hereinafter.

The face of the rotatable tool holder section 140e is provided with a plurality of slots 140m and 140p into which the tool 95 may be disposed for positioning same at different angles. Retainer members 140r are adapted to be positioned in suitable openings 140s to retain the tool 95 in the particular slot 140m or 140p which is used for the tool 95. Thus, when the tool 95 is in the inclined slot 140m as shown in FIG. 8, the tool 95 itself is inclined with respect to the face 111. By releasing the resiliently loaded retaining pin 140g by pulling same outwardly to move its inner end out of the hole 140h (FIG. 12), the plate portion 140e may be rotated to locate the slot 140p approximately 90° from the position shown in the drawings so that the tool 95 is then substantially vertically aligned with respect to the flange F-1 when disposed in the slot 140p with suitable retaining screws or members 140r in the openings 140s adjacent the slot 140p. It is to be noted that the slot 140p may be located on either the right-hand or the left-hand side as viewed in FIG. 8, depending upon the direction of rotation or the amount of rotation of the rotatable section 140e. A conventional threaded adjustment rod 140t having an actuating handle 140w (FIGS. 8, 9 and 12) is threadedly mounted in a threaded opening 140v in the non-rotatable portion of the holder 140 so that upon a rotation of the threaded rod 140t, the rotatable portion 140e as well as the non-rotatable portion 140k may move relative to the non-rotatable and non-sliding portion 140l of the work holder 140. Thus, the tool 95 may be moved upwardly and downwardly with respect to the face 111 of the flange F-1 as will be well understood.

In the operation or use of the form of the invention illustrated in particular in FIGS. 8-19, the column or mast 125 together with the base 120 and its gripping members 121 are initially positioned separately from the rest of the apparatus A-1 so that the gripping members 121 are disposed in the bore 110 of the pipe P-1. By the use of a long stem screwdriver or elongate wrench, the bolt heads 123a are engaged and are rotated to cause each of the expanders 122 to move upwardly for forcing the gripping members 121 outwardly so that the teeth 121a engage the bore 110 in gripping engagement therewith to thereby support the base 120 and the mast 125 in position relative to the pipe P-1.

After the base 120 has been firmly secured in the bore 110, the mast 125 is oriented vertically so that it is substantially perpendicular to the face 111 of the flange F-1, using essentially the same apparatus heretofore described in connection with FIG. 4. Thus, the collar 91 may be disposed around the lower portion of the mast 125 so that it rotates relative thereto, with the contact member 95a (FIG. 4) in contact with the flange face 111. In the event the mast 125 is not vertically disposed, the adjusting screws 126 may be threaded and unthreaded appropriately to permit a change in the angle or position of the mast 125 to vertically align same as reflected by the readings on the dial indicator 95 when it is rotated with the contact member 95a in contact with the flange face 111.

After the mast 125 has thus been vertically positioned, the alignment means B of FIG. 4 is removed and thereafter, the rest of the apparatus is mounted on the mast 125, which is accomplished by positioning the housing 131 with the bearings 131b in position on the mast 125. The support cap 167 with the ring gear 130 and the motor M-1 and the other parts therewith are then positioned on the housing 131, using the pins 130a. Bolts 130b are then added through the holes provided in the cap 167. The retaining bolt 163 is threaded into the threads 125g to connect the upper parts to the mast 125 as shown in FIG. 10, and the bolts 130b are tightened as necessary.

If the longitudinally extending arm 133 has not already been mounted on the housing section 132, it is then positioned in the guide recess 132a and it is clamped therein at the desired location by the clamping plates 132c and 132e, as previously explained. The cutting tool assembly C-1 is normally positioned on the arm 133, but it may be added at any time and it is positioned so that the cutting tool 95 is in position for cutting the face 111 of the flange F-1. It is to be noted that the gears in the gear box 150 are disposed on one side of the housing 131 from the tool 95 so that the arm 133 is under tension during the cutting of the metal from the face 111 with the tool 95 as it moves radially inwardly or towards the bore 110 of the pipe P-1.

With the cutting tool 95 positioned as shown in FIG. 8 for the start of the first cut on the face 111, the gears in the gear box 150 are normally first in the neutral position of FIG. 15 and therefore, the shifting handle 143a is manually moved to engage one of the gears 145 or 146 with the gear 141c to thereby rotate the lead screw 141 to move the work holder 140 and the cutting tool 95 therewith radially inwardly or towards the bore 110.

A cut on the face 111 may then be made in a direction away from the bore 110, substantially radially by releasing the holding pin 140g and rotating the rotatable portion 140e approximately 90° in a counterclockwise direction as viewed in FIG. 8 to thereby position the cutting tool 95 at the right-hand side of the work holder 140 as viewed in FIG. 8, but at the opposite angle from that shown in FIG. 8. Thereafter, the gear shift plate 143 is moved to engage the other gear 145 or 146 so as to reverse the direction of rotation of the gear 141c and the lead screw 141 for thereby moving the work piece 140 and the cutting tool 95 therewith in a substantially radial direction outwardly away from the bore 110 to again cut the flange face 111.

It should be noted that regardless of the direction in which the tool 95 moves radially, it is moved rotationally with the rotation of the arm 133 due to the coaction between the gear 149 and the gear 130 on the housing 131. Thus, as explained in connection with the form of the invention shown in FIGS. 1-7, there is a simultaneous feeding of the cutting tool 95 radially, or substantially radially, during the rotation thereof relative to the flange F-1.

For different sizes of flanges, the location of the arm 133 may be changed, as previously explained by loosening the clamping plates 132c and 132e (FIG. 10) and sliding the arm 133 and the lead screw 141 to the extent permitted by the splines 141b. Then the clamping plates 132c and 132e or any other suitable clamping means are reclamped to firmly secure the arm 133 to the housing support section 132 for rotation therewith as previously explained.

The gears in the gear box 150 may be disengaged from the gear 130 by pivoting the entire gear box housing 150 and the gears therewith about the pivot pin mounting 136.

In some instances, it may be desirable to use the cutting tool 95 of the apparatus A-1 for cutting the outer annular edge of the flange F-1, and in that case, the handle 140w may be manually rotated for moving the tool 95 downwardly in engagement with the outer annular surface of the flange F-1 as it is rotated by the motor M-1 as previously explained. It will also be understood that the handle 140w is used for adjusting the extent of cutting action by the tool 95 for each pass thereof with respect to the flange face 111 or the annular edge of the flange F-1.

The foregoing disclosure and description of the invention are illustrative and explanatory thereof, and various changes in the size, shape, and materials as well as in the details of the illustrated construction may be made without departing from the spirit of the invention.

I claim:
1. A flange facing machine for facing a flange on a tubular member, comprising:
 a tubular support column having a base therewith adapted to fit within the bore of a tubular member having a flange thereon which is to be faced;
 attachment means for releasably securing said base to the inner walls of the tubular member;
 a rotatable tubular frame mounted on and surrounding said support column for rotation relative thereto and extending for substantially the full length of said support column;
 a facing tool secured to said rotatable frame for rotational movement therewith;
 power means for rotating said rotatable frame;
 means operable in response to the rotation of said rotatable frame for automatically and continuously feeding said facing tool substantially radially with respect to the bore of the tubular member as said tool is rotated;
 a power means support cap disposed at the upper end of said support column; and
 a single bolt vertically disposed and extending into the bore of said support column and releasably secured thereto to attach said support cap and power means to said support column, said bolt having an external diameter approximately the same size as the internal diameter of said bore of said support column.

* * * * *